(12) United States Patent  
Shahidehpour

(10) Patent No.: US 7,503,608 B1  
(45) Date of Patent: Mar. 17, 2009

(54) LEAD-IN STRUCTURES FOR FRONT CONSOLE ASSEMBLY

(75) Inventor: Samaneh Shahidehpour, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/972,401

(22) Filed: Jan. 10, 2008

(51) Int. Cl.
*B60J 7/00* (2006.01)

(52) U.S. Cl. .............................. 296/29; 296/70; 296/72; 296/37.8

(58) Field of Classification Search ................ 296/37.8, 296/29, 72, 73, 191; 293/155
See application file for complete search history.

(56) References Cited

U.S. PATENT DOCUMENTS

| | | | |
|---|---|---|---|
| 4,448,327 A | 5/1984 | Gahm | |
| 4,521,050 A | 6/1985 | Rea et al. | |
| 4,690,241 A | 9/1987 | Miyadera et al. | |
| 5,070,577 A | 12/1991 | Bonneville et al. | |
| 5,711,567 A * | 1/1998 | Sinner et al. ................ | 296/37.8 |
| 5,853,205 A | 12/1998 | Enomoto et al. | |
| 5,873,749 A | 2/1999 | Takiguchi et al. | |
| 6,439,652 B2 | 8/2002 | Fujita et al. | |
| 6,890,016 B2 | 5/2005 | Brancheriau et al. | |
| 7,040,686 B2 | 5/2006 | Kapteyn | |

\* cited by examiner

*Primary Examiner*—Joseph D Pape  
(74) *Attorney, Agent, or Firm*—Gifford, Krass, Sprinkle, Anderson & Citkowski, P.C.

(57) ABSTRACT

Provided is a lead-in structure of a front console side panel for guiding the assembly thereof to a driver side lower panel. The lead-in structure includes a substrate having an elongated aperture and a plurality of lead-in bumps, whereas the lead-in bumps are spaced apart and aligned in a direction substantially parallel to the longitudinal axis of the aperture. The lead-in bumps collectively have a lead-in surface and are connected onto the substrate and separated from the aperture by a distance. The lead-in bumps optionally are merged to form a singly elongated bump. The angle between the lead-in surface and the aperture is greater than 90 degree, preferably greater than 110 degrees, and more preferably greater than 130 degrees. The number of the lead-in bumps aligned is an integer between 2 and 10. Alternatively, the lead-in bumps are resiliently deformable so as to minimize contact friction during panel assembly. Optionally, the lead-in bumps are made integral to the substrate and the substrate is made of a material illustratively including a metal, a polymer, a resin, a ceramic, or any combination thereof. The lead-in structure optionally further includes a separation rib to provide clearance between the front console side panel and the driver lower panel upon panel assembly.

16 Claims, 4 Drawing Sheets

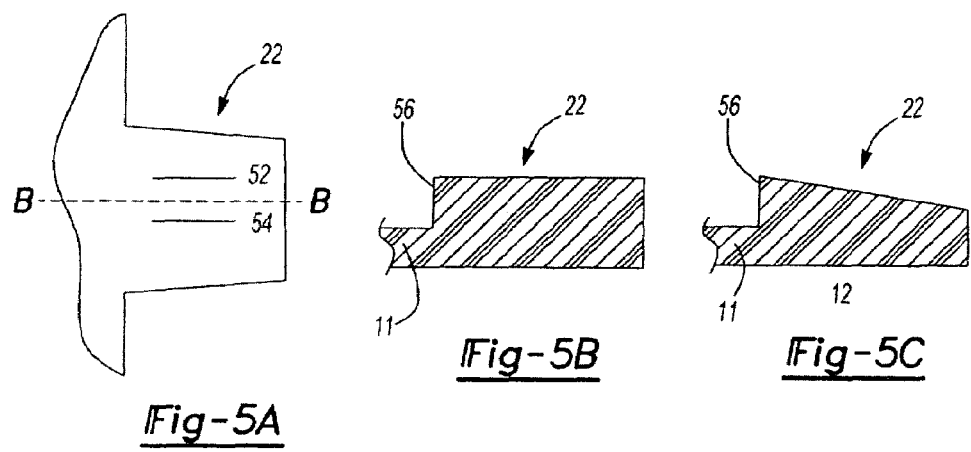
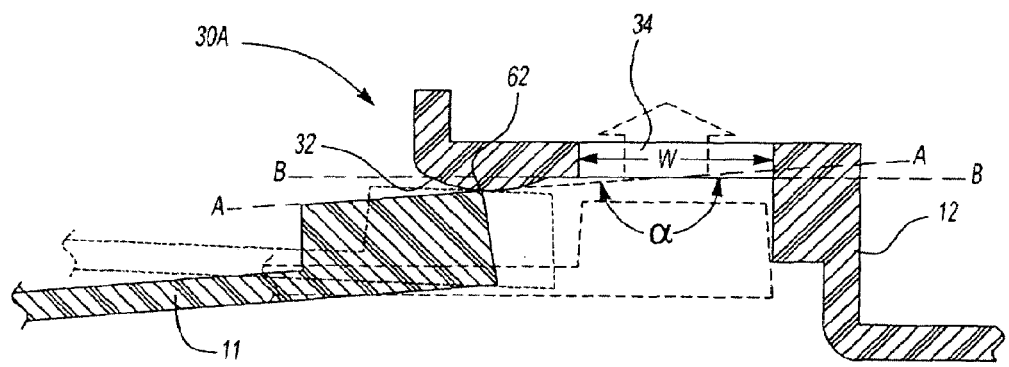

LEAD-IN STRUCTURES FOR FRONT CONSOLE ASSEMBLY

FIELD OF THE INVENTION

The invention relates in general to structures for a front console assembly in a motor vehicle, and more particularly to structures of a front console side panel having a plurality of lead-in bumps facilitating manual engagement thereof to a driver side lower panel to ensure an assembled and lock-in position.

BACKGROUND OF THE INVENTION

Motor vehicles typically include a center console portion disposed along a longitudinal center line of the vehicle to provide housing for instrument panel installation. The center console is generally terminated with a front console assembly on each side of the vehicle which typically includes a top panel, a side panel, and a lower panel. Together, the front console assembly and the center console portion provide a protective coverage for housing the instrument panel for various functional and operational substructures. Due to the intricate interdependence of each panel to the overall assembly, the requirement for technical precision can not be sacrificed. Conventionally, the assembly between the front console side panel and the driver side lower panel is done manually and blindly by a worker who does not have the benefit of actually eye-viewing the assembly process due to the awkward assembly settings involved. As such, imprecision and high-cost in labor are inevitable for effectuating the aforementioned blind assembly. It remains desirable to provide an improved structural mechanism to facilitate the manual assembly of the driver side lower panel to the front console side panel in a more cost-effective manner.

DESCRIPTION OF THE RELATED ART

Various mounting structures are known in the art and are illustrated as below.

U.S. Pat. No. 5,853,205 to Enomoto et al. discloses a locking mechanism for locking a cover to a body, the locking mechanism having a first ramp shaped member for locking the cover in place, a recess for which the first ramp shape member engages, and a second ramp shaped member for guiding the first ramp shaped member into the recess.

U.S. Pat. No. 6,890,016 to Brancheriau discloses a vehicle dashboard assembly having a fuse box and a pair of downwardly extending flanges. The fuse box is housed between the flanges. The fuse box having a pair of ramp shaped members adjacent each other disposed on the surface of a pair of side walls. The flange having a bending member, the bending member having a ramp shaped member. The fuse box is housed within the flanges by the ramp shaped member of each flange, and is guided into the recess between the pair of ramp shaped members of the fuse box side walls.

U.S. Pat. No. 6,439,652 to Fujita et al. discloses a structure for facilitating the mounting of an instrument panel onto a given portion of the motor vehicle. The structure being an opening of the instrument panel defined by a pair of ramp shaped members spaced apart and opposite each other. The ramp shaped members are oriented such that a portion of the instrument panel is guided into the opening and secured to the motor vehicle therein.

U.S. Pat. No. 5,070,577 to Bonneville et al. discloses a collapsible container having a separable hinge assembly, the hinge assembly having a first member and a second member. The first member has a plurality of alternating first pins and second pins arranged horizontally on the distal end. The pins are adapted to receive corresponding members of the second member.

However, none of the prior art discloses a guiding mechanism for a front console panel assembly and in particular a guiding mechanism located on a front console side panel having a plurality of bumps spaced apart from each other and aligned on a vertical axis adjacent an aperture for which a tab is to be inserted.

SUMMARY OF THE INVENTION

Provided is a lead-in structure of a front console side panel for guiding the assembly thereof to a driver side lower panel. The lead-in structure includes a substrate having an elongated aperture and a plurality of lead-in bumps, whereas the lead-in bumps are spaced apart and aligned in a direction substantially parallel to the longitudinal axis of the aperture. The lead-in bumps collectively have a lead-in surface and are connected onto the substrate and separated from the aperture by a distance. The lead-in bumps optionally are merged to form a singly elongated bump. The angle between the lead-in surface and the aperture is greater than 90 degree, preferably greater than 110 degrees, and more preferably greater than 130 degrees. The number of the lead-in bumps aligned is an integer between 2 and 10. Alternatively, the lead-in bumps are resiliently deformable so as to minimize contact friction during panel assembly. Optionally, the lead-in bumps are made integral to the substrate and the substrate is made of a material illustratively including a metal, a polymer, a resin, a ceramic, or any combination thereof. The lead-in structure optionally further includes a separation rib to provide clearance between the front console side panel and the driver side lower panel upon panel assembly.

BRIEF DESCRIPTION OF THE DRAWINGS

Advantages of the present invention will be readily appreciated as the same becomes better understood by reference to the following detailed description when considered in connection with the accompanying drawings, wherein:

FIG. 5A is an enlarged perspective view of an insertion tab projected from the driver side lower panel. FIG. 5B is an enlarged cross-sectional view of the insertion tab having a substantially rectangular cross-section, taken along line B-B of FIG. 5A, FIG. 5C is an enlarged cross-sectional view of the insertion tab having a ramping cross-section, taken along line B-B of FIG. 5A; and FIG. 6 is an enlarged perspective view of a plurality of the lead-in bumps relative to an aperture.

DETAILED DESCRIPTION OF THE INVENTION

Figure 1:
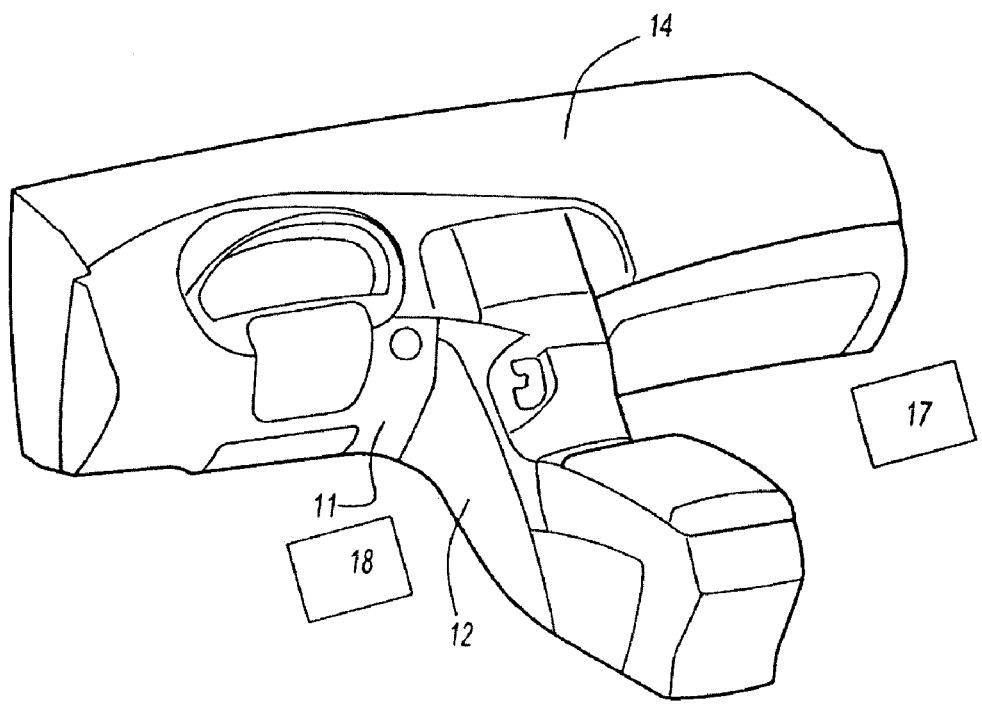
FIG. 1 is a perspective view showing relative location of a front console side panel and a driver side lower panel within a motor vehicle.
Figure 4A:
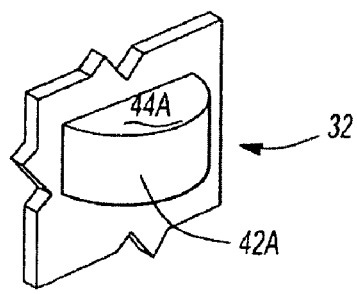
FIG. 4A, 4B, 4C, or 4D each is an enlarged perspective view of an individual lead-in bump.
Figure 4B:
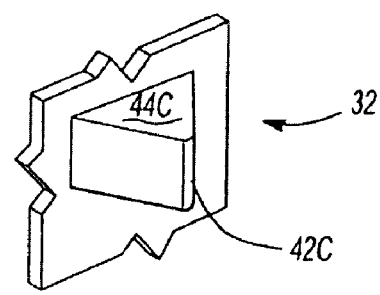
Figure 4C:
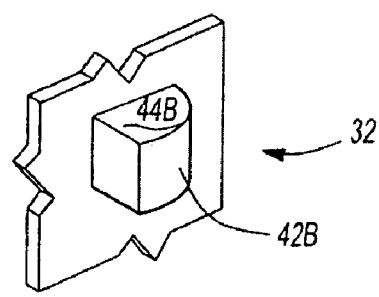
Figure 4D:
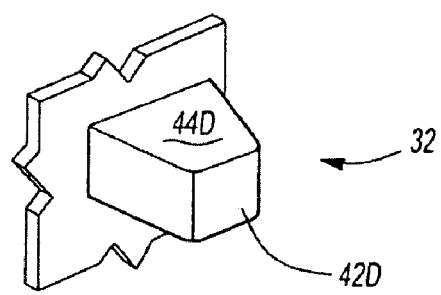

For elements common to the various embodiments of the invention, the numerical reference character between the embodiments is held constant. However, similar elements with variable location or construction are distinguished by the addition of an alphanumeric character. In other words, for example, an element referenced at 30A in the first instance is correspondingly referenced at 30B to reflect a structural variation.

Referring to FIG. 1, an instrument panel 14 is shown to be connected, at the driver side 18, to the driver side lower panel 11 and the front console side panel 12. At the driver side 18, in an assembled state, the driver side lower panel 11 is in structural continuation with a front console side panel 12. It is understood that similar arrangement exists for the passenger side 17 and the present invention is applicable equally thereto, however, for mere illustrative purposes, the present description is only referenced to the driver side 18. The driver side lower panel 11, the front console side panel 12, and the instrument panel 14 collectively form a housing behind which an instrument system is installed. As such it is important that individual pieces of the front console side panel 12 and the driver side lower panel 11 are assembled precisely and effectively.

Figure 2:
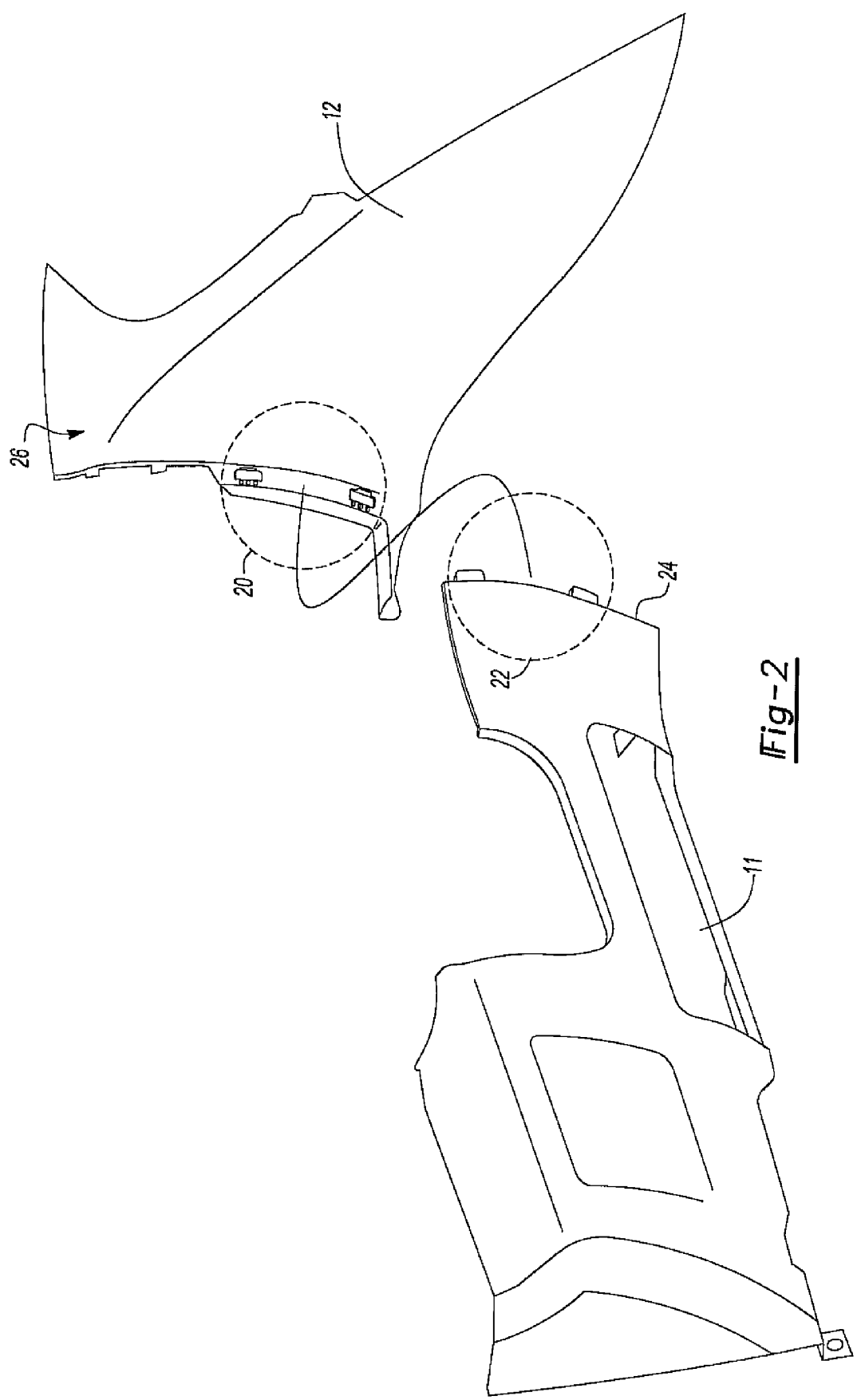
FIG. 2 is a perspective view showing relative panel engagement between the front console side panel and the driver side lower panel through a lead-in structure.

As shown in FIG. 2, the driver side lower panel 11 has one or more insertion tabs 22 projected from a contacting side wall 24. Likewise, the front console side panel 12 has a lead-in structure 20 (discussed in more detail below) located on the anterior portion 26 thereof. It is appreciated that the panel assembly between the driver side lower panel 11 and the front console side panel 12 is accomplished through the engagement of the insertion tabs 22 within the lead-in structure 20.

Figure 3A:
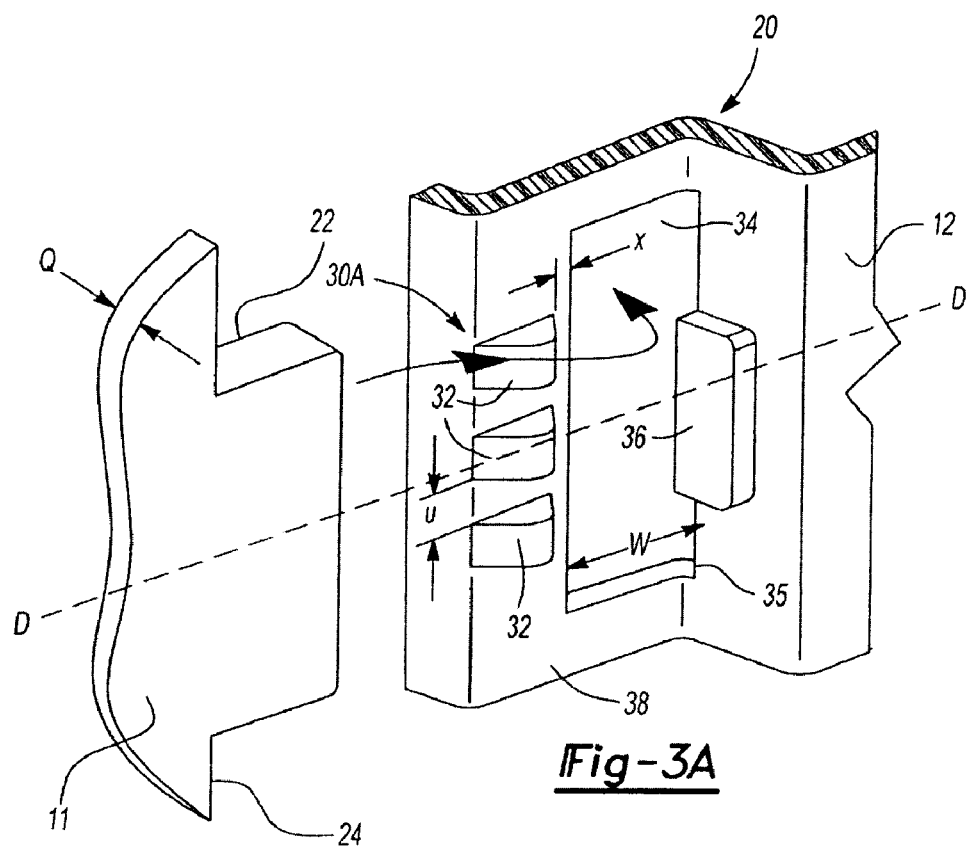
FIG. 3A or 3B is an enlarged perspective view of the lead-in structure.
Figure 3B:
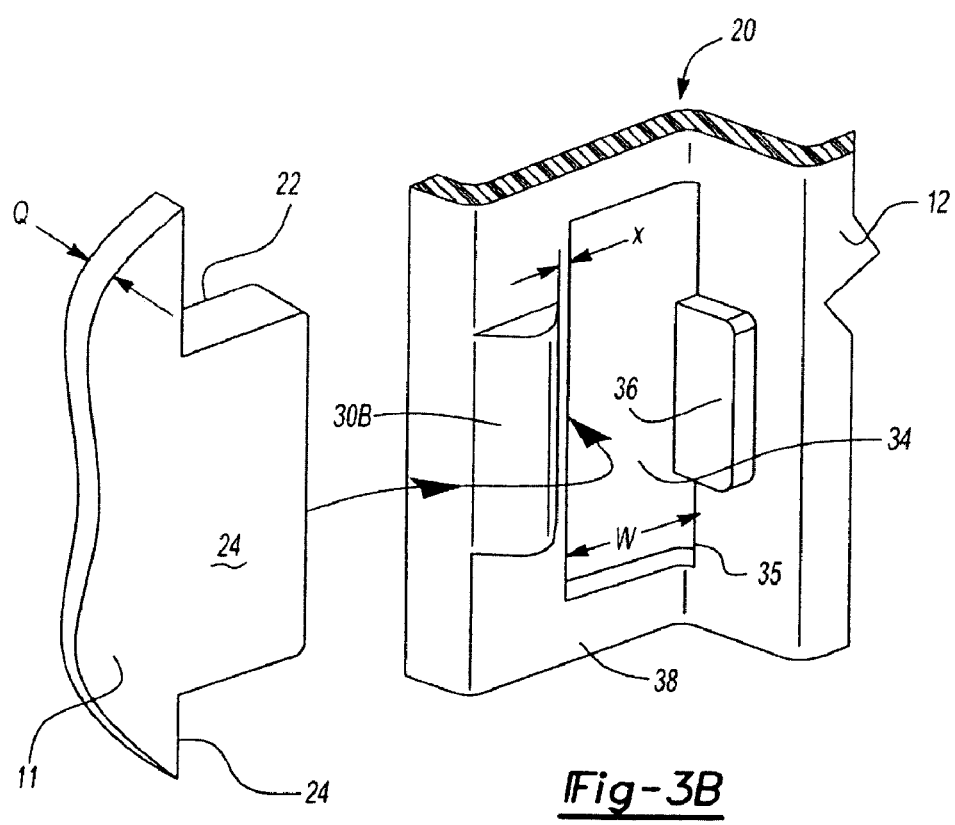

Referring to FIGS. 3A and 3B, a lead-in structure is generally shown at 20. The lead-in structure typically includes a substrate 38 having an elongated aperture 34 through which the insertion tabs 22 are to be inserted and an arrangement of lead-in bumps having the form of either a plurality of bumps aligned longitudinally as shown at 30A or the form of a singly merged elongated bump shown at 30B. In the arrangement shown at 30A, the number of the lead-in bumps 32 is an integer between 2 and 10 and preferably 3 to 6. The lead-in bumps 32 are preferably identical in shape although different shapes are also operable.

Although the substrate 38 may be made of a material illustratively including plastic, polymer, resin, glass, or ceramics, the substrate 38 is typically made part of and in material continuation with the front console side panel 12 for cost-effectiveness. The substrate 38 provides a support surface for the lead-in bumps 32 and the aperture 34. The lead-in bumps 32 are spaced apart with a distance U. Depending on the number of the bumps 32 employed, the distance U is typically a value between 1:10 to 1:2 of the longitudinal length of the aperture 34. The lead-in bumps collectively shown at 30A are aligned in a direction substantially parallel to the longitudinal axis of the aperture 34, abutting the aperture 34 or being separated away from the aperture 34 with a distance X. The value of X is from zero to 40 millimeters, preferably zero to 30 millimeters, and more preferably zero to 25 millimeters. The distance X is designed so as to accommodate the guided insertion of the panel assembly. Factors relevant to the distance X illustratively include the thickness Q of the driver side lower panel 11 the shape of the lead-in bumps 32, and the width W of the aperture 34. It is appreciated that thicker the driver side lower panel 11, wider the width W of the aperture 34, and likely greater the distance X.

Optionally provided as shown in FIGS. 3A-3B is a separation rib 36 located substantially adjacent the longitudinal rim 35 of the aperture 34 and directed away from the lead-in bumps 30A, 30B. It is appreciated that the separation rib 36 is primarily situated to provide a clearance upon the assembly between the front console side panel 12 and the driver side lower panel 11. The separation rib 36 is made of material that is capable of absorbing friction and potential disengagement upon active movement of the vehicle. Preferably, the separation rib 36 is made of rubber, polymer gel, fabrics, or soft plastics. Preferably, the separation rib 36 is of a narrow and elongated form such that it is well hidden behind the panel assembly to maintain the simplicity of the outlook of the panel assembly.

In a particular instance, the lead-in bumps 32 are made integral to and hence in material continuation with the substrate 38. Alternatively, the lead-in bumps 32 are separately constructed and added onto die substrate 38. One advantage of constructing the lead-in bumps 32 separately is his is when an alternative material may be used and hence an additional benefit may be obtained. By way of example, the lead-in bumps 32 are optionally made of resilient and deformable materials, such as rubber, soft plastics, or polymer hydrogel. The deformable version of the lead-in bumps 32 helps to reduce and minimize contact friction during the panel assembly through the aperture 34.

Now turning to FIGS. 4A-4D where the lead-in bump 32 is shown in illustratively various shapes, although it is certain that other shapes are also operable for the present invention. The lead-in bump 32 generally has an upper wall 44A-44D and a lead-in surface 42A-42D with the latter being contacted by the driver lower panel 11 and guides the panel assembly thereto. The upper wall 44A-44D defining the cross-sectional view of the lead-in bump 32 is of a shape illustratively including a substantially half circle depicted in FIG. 4A, a substantially quarter circle depicted in FIG. 4B, a substantially sharp triangle depicted in FIG. 4C, and a trapezoid depicted in FIG. 4D. The lead-in surface 42A-42D functions as a distinctive marker for a worker's hand in searching for the location of the aperture 34 and also provides a point-of-contact for the driver side lower panel 11 that is to be assembled.

An insertion tab 22 in an enlarged plane view is shown in FIG. 5A to be attached to the driver side lower panel 11. An enlarged cross-sectional view of the tab 22, viewed from the line B-B of FIG. 5A, is shown in FIG. 5B as having a substantially rectangular cross-section or in FIG. 5C as having a ramping cross-section. The tab 22 possesses an elevation point 56 which helps to engage the tab 22 within the aperture 34 and effectively prevents accidental disengagement. Additionally, the insertion tab 22 optionally includes one or more locking ribs 52, 54. The combined effect of the tab 22 and the locking ribs 52, 54 is to provide fixed engagement between the insertion tab 22 and the aperture 34 upon the intended panel assembly. Although suitable to be constructed out of any materials, the locking ribs 52, 54 are preferably made integral to and hence in material continuation with the insertion tab 22 for cost considerations.

FIG. 6 is a perspective view of a driver side lower panel 11 being assembled to a front console side panel 12 through engagement between the tab 22 of FIG. 5B and the aperture 34 having a width W. Viewed from the line D-D of FIG. 3A, a lead-in bump 32 having a tip point 62 is exemplary of a longitudinal arrangement 30A. The driver side lower panel 11 is being led in through contacting the tip point 62 of each lead-in bump 32 within the longitudinal alignment 30A to from a collective lead-in surface shown at A-A. The lead-in surface A-A forms an angle α with the plane surface B-B of the aperture 34. The angle α is greater than 90 degrees, preferably greater than 110 degrees, and more preferably greater than 130 degrees.

With the benefit of the lead-in structure 20, a worker is able to work in a more targeted and labor-efficient way in installing the driver side lower panel 11 onto the front console side panel 12 that has already been set in place within the vehicle. In operation, the worker has the benefit of orienting himself as the relative location of the lead-in bumps 32 and then leads the driver side lower panel 11 to lie against the lead-in bumps 32. Once having localized the bumps 32, the worker is able to insert the protruded tabs 22 through the aperture 34 that lies adjacent to the lead-in bumps 32. It is appreciated that the lead-in bumps 32 with distinctive shapes and alignment provide more sensibility for a human hand than an ordinary flat surface would. As such, with the assistance of the bumps 32, the worker is able to precisely locate the aperture 34 with more ease. Furthermore, the collective lead-in surface 42 of the lead-in bumps 32 with the angle α greater than 90 degrees effectively functions as a ramping structure to guide the protruded insertion tab 22 more definitively through the aperture 34.

The invention has been described in an illustrative manner. It is, therefore, to be understood that the terminology used is intended to be in the nature of words of description rather than of limitation. Many modifications and variations of the invention are possible in light of the above teachings. Thus, with the scope of the appended claims, the invention may be practiced other than as specifically described.

I claim:

1. A lead-in structure for a front console assembly within a motor vehicle, said structure comprising:
    a substrate having an aperture, said aperture having a longitudinal axis;
    a plurality of lead-in bumps connected to said substrate, said lead-in bumps being spaced apart and aligned in a direction substantially parallel to said longitudinal axis of said aperture and collectively having a lead-in surface, wherein the angle between said lead-in surface and said aperture is greater than 90 degrees; and
    a separation rib attached to said substrate and directed away from said lead-in bumps.

2. The lead-in structure of claim 1, wherein said plurality of lead-in bumps is an integer between 2 and 10.

3. The lead-in structure of claim 1, wherein the angle is greater than 110 degrees.

4. The lead-in structure of claim 1, wherein said plurality of lead-in bumps are separated from said aperture by a distance.

5. The lead-in structure of claim 1, wherein said plurality of the lead-in bumps are merged to form a singly longitudinal bump.

6. The lead-in structure of claim 1, wherein said plurality of the lead-in bumps are resiliently deformable so as to minimize contact friction during assembly.

7. The lead-in structure of claim 1, wherein said plurality of the lead-in bumps are in material continuity with said substrate.

8. The lead-in structure of claim 1, wherein said substrate is a metal, a polymer, a resin, a ceramic, or any combination thereof.

9. A front console side panel having a lead-in structure for guiding the assembly thereof to a driver side lower panel, said panel comprising:
    a substrate having an aperture, said aperture having a longitudinal axis; and
    a plurality of lead-in bumps spaced apart and aligned in a direction substantially parallel to said longitudinal axis of said aperture and collectively having a lead-in surface, wherein the angle between said lead-in surface and the aperture is greater than 90 degrees.

10. The front console side panel of claim 9, wherein the angle is greater than 110 degrees.

11. The front console side panel of claim 9, wherein said said plurality of lead-in bumps are merged to form a singly longitudinal bump.

12. The front console side panel of claim 9, wherein said plurality of the lead-in bumps are resiliently deformable so as to minimize contact friction during said assembly.

13. The front console side panel of claim 9, wherein said plurality of the lead-in bumps are in material continuity with said substrate.

14. The front console side panel of claim 9, wherein said substrate is a metal, a polymer, a resin, a ceramic, or any combination thereof.

15. The front console side panel of claim 9 further comprising a separation rib to provide clearance between the front console side panel and the driver lower panel during assembly.

16. The front console side panel of claim 9, wherein said plurality of said lead-in bumps are separated away from said aperture by a distance.

* * * * *

UNITED STATES PATENT AND TRADEMARK OFFICE
CERTIFICATE OF CORRECTION

PATENT NO. : 7,503,608 B1
APPLICATION NO. : 11/972401
DATED : March 17, 2009
INVENTOR(S) : Samaneh Shahidehpour It is certified that error appears in the above-identified patent and that said Letters Patent is hereby corrected as shown below:

Column 1, line 63 after "guided" insert --further--
Column 4, line 13 replace "die" with --the--
Column 4, line 14 replace "his" with --this--
Column 5, line 22 replace "with" with --within--
Column 6, line 2 delete "the"
Column 6, line 5 delete "the"
Column 6, line 8 delete "the"
Column 6, line 26 delete "said"
Column 6, line 29 delete "the"
Column 6, line 32 delete "the"

Signed and Sealed this

Thirtieth Day of June, 2009

JOHN DOLL
*Acting Director of the United States Patent and Trademark Office*